US010715384B2

(12) United States Patent
Miller et al.

(10) Patent No.: US 10,715,384 B2
(45) Date of Patent: Jul. 14, 2020

(54) AUTOMATICALLY MODIFYING COMPUTER PARAMETERS AS AN INCENTIVE FOR COMPLYING WITH DATA POLICIES

(71) Applicant: INTUIT INC., Mountain View, CA (US)

(72) Inventors: Michael T. Miller, Rancho Santa Fe, CA (US); Brian W. Gardner, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 183 days.

(21) Appl. No.: 14/929,101

(22) Filed: Oct. 30, 2015

(65) Prior Publication Data
US 2017/0126585 A1 May 4, 2017

(51) Int. Cl.
*H04L 12/24* (2006.01)
*H04L 12/851* (2013.01)
*H04L 12/26* (2006.01)

(52) U.S. Cl.
CPC ...... *H04L 41/0813* (2013.01); *H04L 41/0886* (2013.01); *H04L 43/0876* (2013.01); *H04L 47/24* (2013.01); *H04L 41/5009* (2013.01)

(58) Field of Classification Search
CPC .. H04L 47/80; H04L 41/0813; H04L 41/0886
See application file for complete search history.

(56) References Cited

U.S. PATENT DOCUMENTS

| 2008/0005113 | A1* | 1/2008 | Li .................... H04L 67/104 |
| 2008/0155087 | A1* | 6/2008 | Blouin .............. H04L 43/0817 709/223 |
| 2008/0172288 | A1 | 7/2008 | Pilskalns et al. |

(Continued)

FOREIGN PATENT DOCUMENTS

| KR | 10-2009-0000286 | | 1/2009 |
| WO | 2010/045675 | A1 | 4/2010 |
| WO | 2015/101983 | A1 | 7/2015 |

OTHER PUBLICATIONS

International Search Report and Written Opinion dated Jul. 27, 2016 for Application No. PCT/US2015/058499.

*Primary Examiner* — Tonia L Dollinger
*Assistant Examiner* — Joseph M Cousins
(74) *Attorney, Agent, or Firm* — Patterson + Sheridan, LLP

(57) ABSTRACT

One embodiment of the present invention provides a system for automatically modifying computer parameters as an incentive for complying with data policies. During operation, the system receives, at a computing system, a data policy definition, wherein the data policy definition comprises: one or more metrics associated with data usage, and one or more desired vectors associated with the one or more metrics. Next, the system receives, at the computing system, usage statistics for data, wherein the usage statistics comprise the one or more metrics for one or more clients. The system then analyzes the usage statistics to determine, at the computing system, a first score indicating how a first client in the one or more clients is performing compared to the one or more desired vectors for the one or more metrics. Finally, the system automatically modifies a parameter of the computing system associated with the first client based on the first score.

18 Claims, 3 Drawing Sheets

(56) References Cited

U.S. PATENT DOCUMENTS

| | | | |
|---|---|---|---|
| 2010/0057831 A1* | 3/2010 | Williamson | G06F 9/5027 709/203 |
| 2010/0099378 A1* | 4/2010 | Amato | G06Q 20/102 455/408 |
| 2011/0246526 A1 | 10/2011 | Finkelstein et al. | |
| 2012/0155511 A1* | 6/2012 | Shaffer | H04B 1/7143 375/133 |
| 2016/0080495 A1* | 3/2016 | Bilas | H04L 67/1097 709/224 |
| 2016/0095017 A1* | 3/2016 | Ely | H04W 4/027 455/454 |

* cited by examiner

AUTOMATICALLY MODIFYING COMPUTER PARAMETERS AS AN INCENTIVE FOR COMPLYING WITH DATA POLICIES

BACKGROUND

Related Art

The present invention relates to enterprise data systems. More specifically, the present invention relates to a method and an apparatus for automatically modifying computer parameters as an incentive for complying with data policies.

As companies continue to trend toward connectedness of virtually all applications and services, it is critical that providers of data work well with other providers of data, as well as with consumers of their data. This includes the sharing of data between providers to reduce resource wastage and improve the hygiene of the data. However, the desire for data providers to safeguard their data and to not share with other providers is a major obstacle to a streamlined and efficient environment, which can lead to a negative experience for the data consumers. This is especially true when the data providers are within a single enterprise.

For example, consider an enterprise environment of a large corporation. This corporation may offer many different products and services, each sourced from different internal groups within the corporation. Additionally, each group within the corporation maintains information on consumers as they use the different products and services. In this example, each group safeguards their respective data and does not share the data with the other groups, resulting in missed opportunities and lower satisfaction levels of the consumers.

Hence, what is needed is a system for sharing data in the enterprise environment that provides an incentive for complying with organizational data policies.

SUMMARY

One embodiment of the present invention provides a system for automatically modifying computer parameters as an incentive for complying with data policies. During operation, the system receives, at a computing system, a data policy definition, wherein the data policy definition comprises: one or more metrics associated with data usage, and one or more desired vectors associated with the one or more metrics. Next, the system receives, at the computing system, usage statistics for data, wherein the usage statistics comprise the one or more metrics for one or more clients. The system then analyzes the usage statistics to determine, at the computing system, a first score indicating how a first client in the one or more clients is performing compared to the one or more desired vectors for the one or more metrics. Finally, the system automatically modifies a parameter of the computing system associated with the first client based on the first score.

In some embodiments of the present invention, the system analyzes the usage statistics to determine a second score indicating how a second client in the one or more clients is performing compared to the one or more desired vectors for the one or more metrics. Next, the system creates a comparison of the second score to the first score. Finally, the system automatically modifies a parameter of the computing system associated with the second client based on the comparison.

In some embodiments of the present invention, automatically modifying a parameter of the computing system associated with the first client involves providing a reward for the first client.

In some embodiments of the present invention, automatically modifying a parameter of the computing system associated with the first client involves providing a financial credit to the first client.

In some embodiments of the present invention, automatically modifying a parameter of the computing system associated with the first client involves penalizing the first client.

In some embodiments of the present invention, automatically modifying a parameter of the computing system associated with the first client involves changing a bandwidth provided to the first client.

In some embodiments of the present invention, automatically modifying a parameter of the computing system associated with the first client involves changing a priority level of the first client.

In some embodiments of the present invention, automatically modifying a parameter of the computing system associated with the first client involves providing a recognition to the first client.

In some embodiments of the present invention, a metric in the one or more metrics is a measurement of a timeliness of the data.

In some embodiments of the present invention, a metric in the one or more metrics is a measurement of a hygiene of the data.

In some embodiments of the present invention, a metric in the one or more metrics is a measurement of an external usage of the data.

In some embodiments of the present invention, a metric in the one or more metrics is a measurement of a usefulness of a usage of the data.

In some embodiments of the present invention, automatically modifying a Service Level Agreement (SLA) associated with the first client based on the first score.

DETAILED DESCRIPTION

Figure 1:
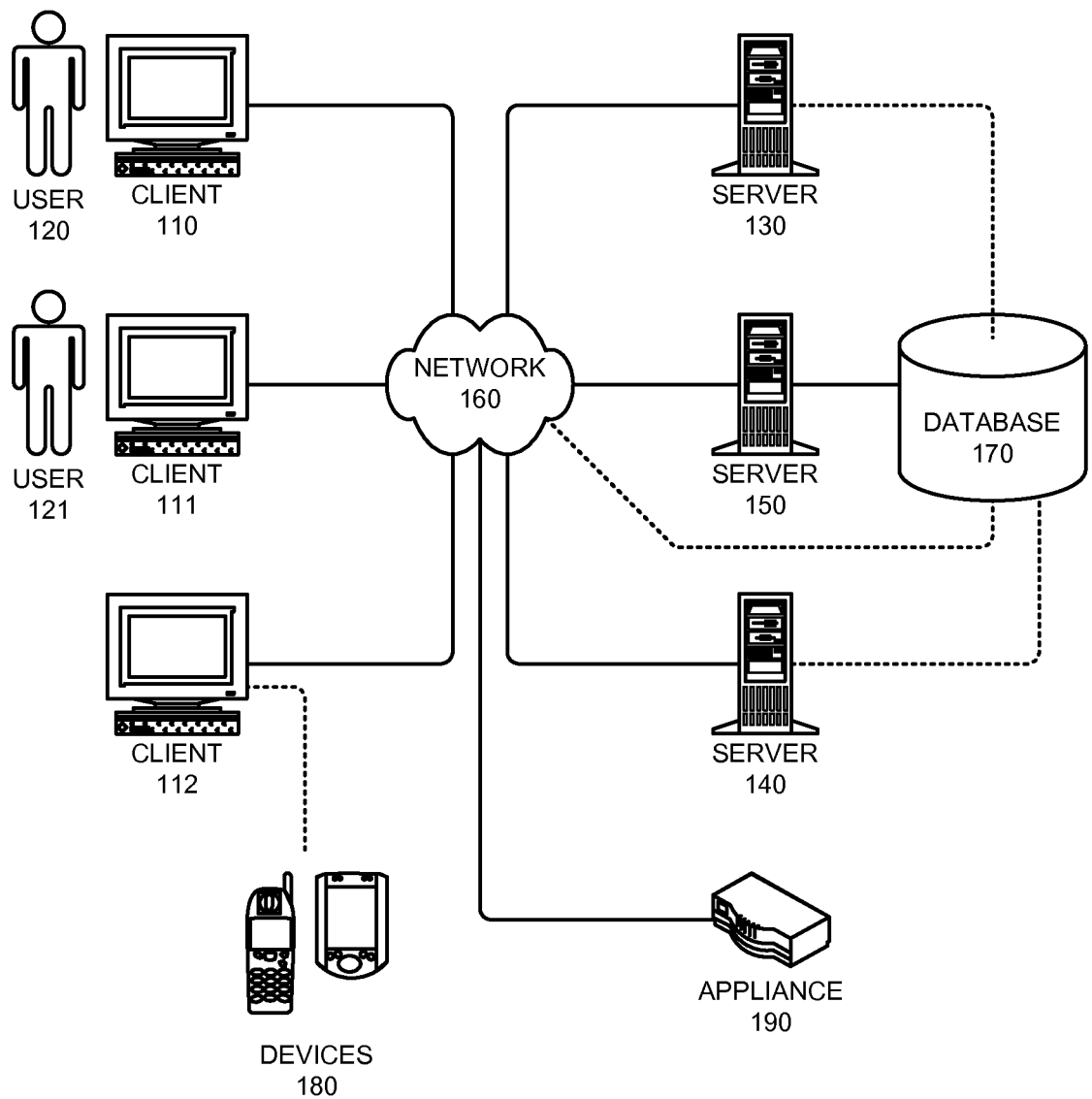
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for automatically modifying computer parameters as an incentive for complying with data policies. During operation, the system receives, at a computing system, a data policy definition, wherein the data policy definition comprises: one or more metrics associated with data usage, and one or more desired vectors associated with the one or more metrics. For example, the one or more metrics may include the timeliness of the data. Is the data provided in real-time or pseudo real-time, or is the data provided in a batch update?

Next, the system receives, at the computing system, usage statistics for data, wherein the usage statistics comprise the one or more metrics for one or more clients. The system then analyzes the usage statistics to determine, at the computing system, a first score indicating how a first client in the one or more clients is performing compared to the one or more desired vectors for the one or more metrics. Note that the method in which the first score is calculated is an implementation detail. Virtually any way a score can be calculated can be used with embodiments of the present invention. The way in which the scores are calculated, including weighting and upper and lower bounds, may be adjusted at regular intervals to achieve a desired outcome.

Finally, the system automatically modifies a parameter of the computing system associated with the first client based on the first score. Note that modifying a parameter of the computing system can be anything from adjusting a level of bandwidth available to the first client, to modifying an access priority level of the first client, to providing a recognition item, such as a banner or badge, to the first client.

In some embodiments of the present invention, the system analyzes the usage statistics to determine a second score indicating how a second client in the one or more clients is performing compared to the one or more desired vectors for the one or more metrics. Next, the system creates a comparison of the second score to the first score. Finally, the system automatically modifies a parameter of the computing system associated with the second client based on the comparison. Thus, modifying the parameter of the computing system associated with a client may be based on how that client performs relative to one or more other clients.

In some embodiments of the present invention, automatically modifying a parameter of the computing system associated with the first client involves providing a reward for the first client. Providing tangible rewards is often a powerful way to encourage changes in behavior, including encouraging the adherence to policies. Thus, in some embodiments of the present invention, automatically modifying a parameter of the computing system associated with the first client involves providing a financial credit to the first client. This can include a reduction in costs for data usage. For example, a high cost for bandwidth may discourage a client from updating the system, but this may be detrimental when the client holds information that is beneficial to the other clients.

In some embodiments of the present invention, automatically modifying a parameter of the computing system associated with the first client involves penalizing the first client. Sometimes encouragement with rewards and incentives is not effective enough at curtailing unwanted behavior. In these instances, a penalty may be necessary to achieve the desired outcome.

In some embodiments of the present invention, a metric in the one or more metrics is a measurement of an external usage of the data. For example, a good measurement of the usefulness of the data provided by the first client is a measure of the external usage of the first client's data. The external usage of the first client's data is simply a measure of the total usage of the first client's data minus the usage by every entity belonging to the first client.

In some embodiments of the present invention, a metric in the one or more metrics is a measurement of a usefulness of a usage of the data. The end goal is an efficient use and sharing of data. Clients that perform actions on the data that provide little or no value should be considered when analyzing the data to determine scores. For example, a client that constantly updates values in the data store with the pre-existing value is not providing any value, but is consuming resources. This type of activity could be discouraged through penalties, or at a minimum, not contribute to rewards or higher scores.

In some embodiments of the present invention, automatically modifying a Service Level Agreement (SLA) associated with the first client based on the first score.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention. For example, some embodiments of the present invention may be implemented solely within database 170, while other embodiments may be implemented within appliance 190. Furthermore, in other embodiments of the present invention, the system may be distributed across multiple components.

Automatically Modifying Computer Parameters

Figure 2:
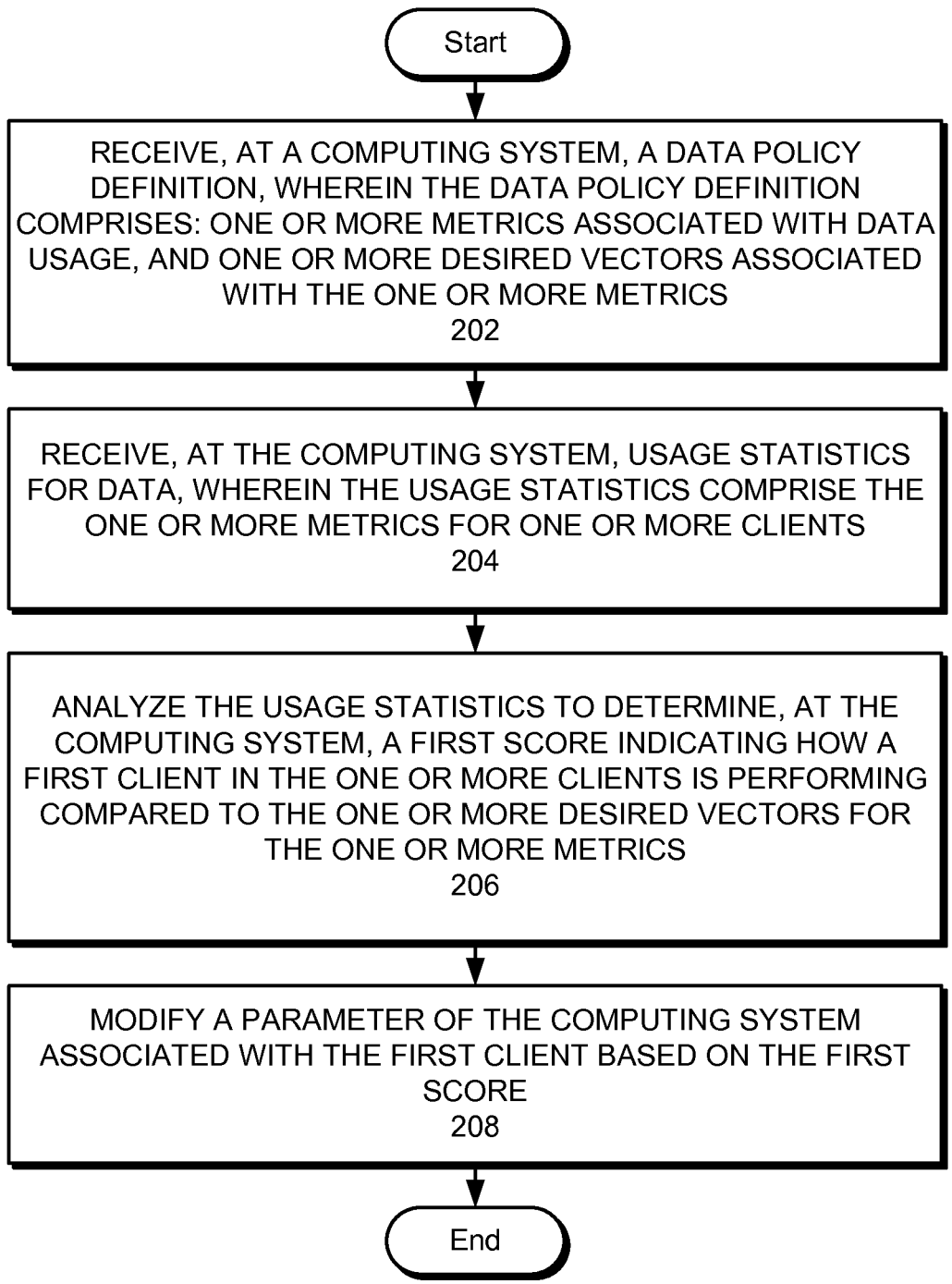
FIG. 2 presents a flow chart illustrating the process of automatically modifying computer parameters as an incentive for complying with data policies in accordance with an embodiment of the present invention.

FIG. 2 presents a flow chart illustrating the process of automatically modifying computer parameters as an incentive for complying with data policies in accordance with an embodiment of the present invention. Note that even though a handful of metrics and parameters are described herein, the number of metrics and parameters is virtually limitless. During operation, the system receives, at a computing system, a data policy definition, wherein the data policy definition comprises: one or more metrics associated with data usage, and one or more desired vectors associated with the one or more metrics (operation 202). Note that, as described previously, the metric may include a measurement of a timeliness of the data, a measurement of a hygiene of the data (is it formatted correctly and is it correct), a measurement of an external usage of the data, a measurement of a usefulness of a usage of the data, and any other measurable attribute of the data.

Next, the system receives, at the computing system, usage statistics for data, wherein the usage statistics comprise the one or more metrics for one or more clients (operation 204). The system then analyzes the usage statistics to determine, at the computing system, a first score indicating how a first client in the one or more clients is performing compared to the one or more desired vectors for the one or more metrics (operation 206). Finally, the system automatically modifies a parameter of the computing system associated with the first client based on the first score (operation 208). Note that, as described previously, automatically modifying the parameter of the computing system may involve: providing a reward to the first client, providing a financial credit to the first client, penalizing the first client, changing a bandwidth provided to the first client, changing a priority level of the first client, providing a recognition to the first client, or virtually any other action that can be programmed into the system.

Figure 3:
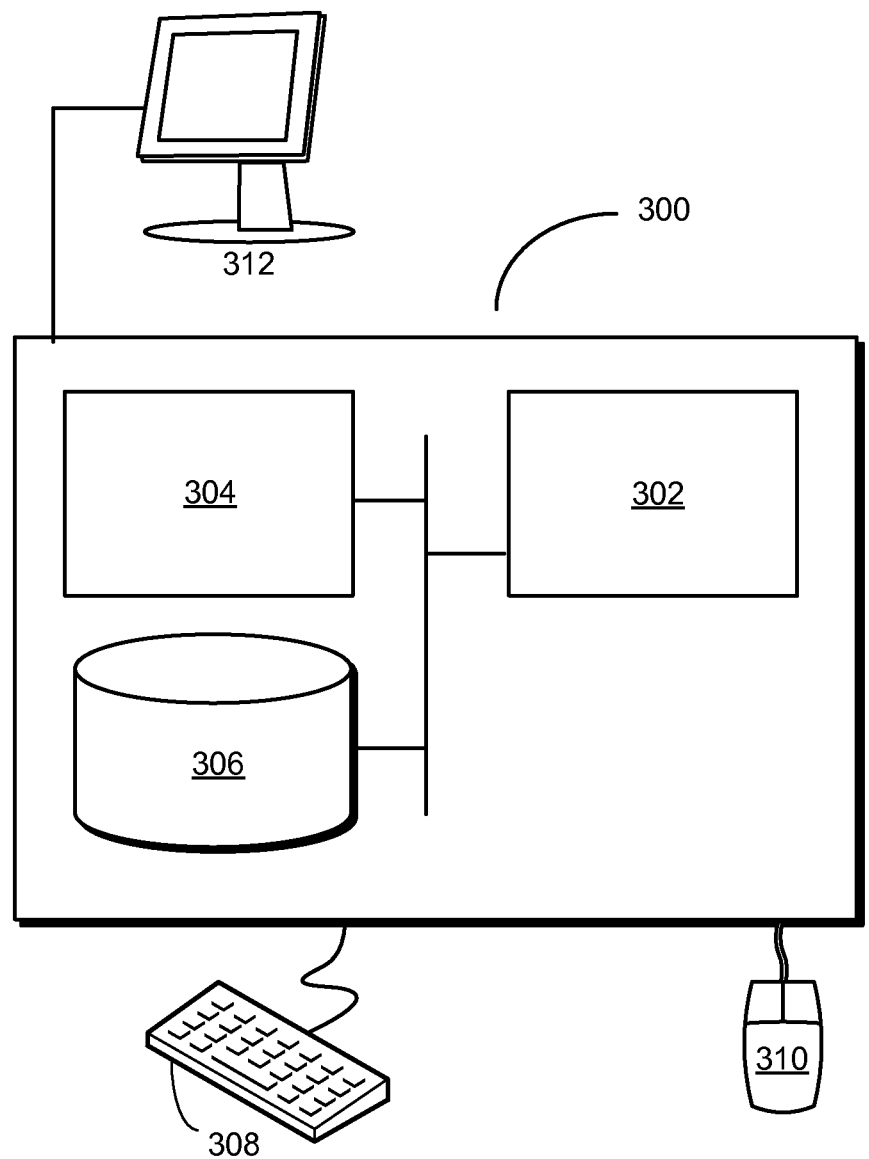
FIG. 3 shows a computer system in accordance with the disclosed embodiments.

FIG. 3 shows a computer system 300 in accordance with an embodiment. Computer system 300 may correspond to an apparatus that includes a processor 302, memory 304, storage 306, and/or other components found in electronic computing devices. Processor 302 may support parallel processing and/or multi-threaded operation with other processors in computer system 300. Computer system 300 may also include input/output (I/O) devices such as a keyboard 308, a mouse 310, and a display 312.

Computer system 300 may include functionality to execute various components of the present embodiments. In particular, computer system 300 may include an operating system (not shown) that coordinates the use of hardware and software resources on computer system 300, as well as one or more applications that perform specialized tasks for the user. To perform tasks for the user, applications may obtain the use of hardware resources on computer system 300 from the operating system, as well as interact with the user through a hardware and/or software framework provided by the operating system.

In addition, one or more components of computer system 300 may be remotely located and connected to the other components over a network. Portions of the present embodiments may also be located on different nodes of a distributed system that implements the embodiments.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically modifying computer parameters as an incentive for complying with data policies, the method comprising:

receiving, at a computing system, a data policy definition that includes two or more types of usage metrics and a desired vector corresponding to each of the two or more types of usage metrics;

receiving, for first data provided by a first client, a first usage metric corresponding to a first type of usage metric included in the data policy definition and a second usage metric corresponding to a second type of usage metric included in the data policy definition, wherein the first usage metric comprises a total usage of the first data by a plurality of clients other than the first client, and the second usage metric comprises either a timeliness of the first data or a measurement of a hygiene of the first data;

receiving, for second data provided by a second client, a third usage metric corresponding to the first type of usage metric and a fourth usage metric corresponding to the second type of usage metric, wherein the third usage metric comprises a total usage of the second data by a plurality of clients other than the second client, and the fourth usage metric comprises either a timeliness of the second data or a measurement of a hygiene of the second data;

determining a first score for the first client by comparing the first usage metric to the desired vector corresponding to the first type of usage metric and comparing the second usage metric to the desired vector corresponding to the second type of usage metric;

determining a second score for the second client by comparing the third usage metric to the desired vector corresponding to the first type of usage metric and comparing the fourth usage metric to the desired vector corresponding to the second type of usage metric;

comparing the second score to the first score; and automatically modifying an amount of bandwidth associated with the first client based on a result of comparing the second score to the first score.

2. The method of claim 1, further comprising: and automatically modifying an amount of bandwidth associated with the second client based on the result.

3. The method of claim 1, further comprising: providing a reward for the first client based on the first score.

4. The method of claim 1, further comprising: providing a financial credit to the first client based on the first score.

5. The method of claim 1, further comprising: penalizing the first client based on the first score.

6. The method of claim 1, further comprising: changing an access priority level of the first client based on the first score.

7. The method of claim 1, further comprising: providing a recognition to the first client based on the first score.

8. The method of claim 1, further comprising automatically modifying a Service Level Agreement (SLA) associated with the first client based on the first score.

9. A non-transitory computer-readable storage medium storing instructions that when executed by a computer cause the computer to perform a method for automatically modifying computer parameters as an incentive for complying with data policies, the method comprising:

receiving, at a computing system, a data policy definition that includes two or more types of usage metrics and a desired vector corresponding to each of the two or more types of usage metrics;

receiving, for first data provided by a first client, a first usage metric corresponding to a first type of usage metric included in the data policy definition and a second usage metric corresponding to a second type of usage metric included in the data policy definition, wherein the first usage metric comprises a total usage of the first data by a plurality of clients other than the first client, and the second usage metric comprises either a timeliness of the first data or a measurement of a hygiene of the first data;

receiving, for second data provided by a second client, a third usage metric corresponding to the first type of usage metric and a fourth usage metric corresponding to the second type of usage metric, wherein the third usage metric comprises a total usage of the second data by a plurality of clients other than the second client, and the fourth usage metric comprises either a timeliness of the second data or a measurement of a hygiene of the second data;

determining a first score for the first client by comparing the first usage metric to the desired vector corresponding to the first type of usage metric and comparing the second usage metric to the desired vector corresponding to the second type of usage metric;

determining a second score for the second client by comparing the third usage metric to the desired vector corresponding to the first type of usage metric and comparing the fourth usage metric to the desired vector corresponding to the second type of usage metric;

comparing the second score to the first score; and automatically modifying an amount of bandwidth associated with the first client based on a result of comparing the second score to the first score.

10. The non-transitory computer-readable storage medium of claim 9, wherein the method further comprises: and automatically modifying an amount of bandwidth associated with the second client based on the result.

11. The non-transitory computer-readable storage medium of claim 9, further comprising: providing a reward for the first client based on the first score.

12. The non-transitory computer-readable storage medium of claim 9, further comprising: providing a financial credit to the first client based on the first score.

13. The non-transitory computer-readable storage medium of claim 9, further comprising: penalizing the first client based on the first score.

14. An apparatus configured for automatically modifying computer parameters as an incentive for complying with data policies, comprising: a memory; one or more processors; and a non-transitory computer-readable storage medium storing instructions that when executed by the one or more processors cause the apparatus to perform a method comprising:

receiving, at a computing system, a data policy definition that includes two or more types of usage metrics and a desired vector corresponding to each of the two or more types of usage metrics;

receiving, for first data provided by a first client, a first usage metric corresponding to a first type of usage metric included in the data policy definition and a second usage metric corresponding to a second type of usage metric included in the data policy definition, wherein the first usage metric comprises a total usage of the first data by a plurality of clients other than the first client, and the second usage metric comprises either a timeliness of the first data or a measurement of a hygiene of the first data;

receiving, for second data provided by a second client, a third usage metric corresponding to the first type of usage metric and a fourth usage metric corresponding to the second type of usage metric, wherein the third usage metric comprises a total usage of the second data by a plurality of clients other than the second client, and the fourth usage metric comprises either a timeliness of the second data or a measurement of a hygiene of the second data;

determining a first score for the first client by comparing the first usage metric to the desired vector corresponding to the first type of usage metric and comparing the second usage metric to the desired vector corresponding to the second type of usage metric;

determining a second score for the second client by comparing the third usage metric to the desired vector corresponding to the first type of usage metric and comparing the fourth usage metric to the desired vector corresponding to the second type of usage metric;

comparing the second score to the first score; and automatically modifying an amount of bandwidth associated with the first client based on a result of comparing the second score to the first score.

15. The apparatus of claim 14, wherein the method further comprises: automatically modifying an amount of bandwidth associated with the second client based on the result.

16. The apparatus of claim 14, wherein the method further comprises providing a reward for the first client based on the first score.

17. The apparatus of claim 14, wherein the method further comprises providing a financial credit to the first client based on the first score.

18. The apparatus of claim 14, wherein the method further comprises automatically modifying a Service Level Agreement (SLA) associated with the first client based on the first score.

* * * * *